United States Patent
Bharucha et al.

(10) Patent No.: US 11,453,506 B2
(45) Date of Patent: Sep. 27, 2022

(54) AIRCRAFT EJECTION SEAT ASSEMBLY WITH INTEGRATED SURVIVAL KIT

(71) Applicant: AMI Industries, Inc., Colorado Springs, CO (US)

(72) Inventors: Nicholas Kersi Charles Bharucha, Colorado Springs, CO (US); Steven Andrew Holstine, Colorado Springs, CO (US); Casey Andrew Stribrny, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 0 days.

(21) Appl. No.: 17/196,618

(22) Filed: Mar. 9, 2021

(65) Prior Publication Data

US 2021/0331809 A1 Oct. 28, 2021

Related U.S. Application Data

(60) Provisional application No. 63/016,433, filed on Apr. 28, 2020.

(51) Int. Cl.
*B64C 25/10* (2006.01)
*B64D 25/10* (2006.01)
*B60R 7/04* (2006.01)

(52) U.S. Cl.
CPC .............. *B64D 25/10* (2013.01); *B60R 7/043* (2013.01)

(58) Field of Classification Search
CPC .................... B64C 25/10; B60R 7/043
See application file for complete search history.

(56) References Cited

U.S. PATENT DOCUMENTS

| | | | | |
|---|---|---|---|---|
| 3,020,011 | A | * | 2/1962 | Beem ............... B64D 25/10 244/141 |
| 3,337,264 | A | * | 8/1967 | Collins ............. B64D 11/0689 297/230.12 |
| 3,556,442 | A | | 1/1971 | Arnekull |
| 4,505,444 | A | | 3/1985 | Martin |
| 4,911,382 | A | | 3/1990 | Aronne |
| 5,979,829 | A | * | 11/1999 | Nance ............... B64D 25/10 244/141 |
| 6,629,671 | B1 | | 10/2003 | Hilsenbeck |

FOREIGN PATENT DOCUMENTS

| | | |
|---|---|---|
| CN | 202807102 | 3/2013 |
| CN | 104029819 | 9/2014 |
| CN | 110588992 | 12/2019 |
| GB | 831472 | 3/1960 |
| GB | 2253597 | 1/1971 |
| RU | 2119878 | 10/1998 |
| RU | 2266239 | 12/2005 |

* cited by examiner

*Primary Examiner* — Richard G Davis
(74) *Attorney, Agent, or Firm* — Snell & Wilmer L.L.P.

(57) ABSTRACT

An aircraft ejection seat assembly is disclosed where a survival kit is incorporated into a seat back of an ejection seat, and that is released from the ejection seat by one or more actuators. The survival kit is attached to the parachute lines. One or more retention pins may secure the survival kit relative to the seat back. Representative actuators that may be used to move the retention pin(s) to a release configuration including mechanical (e.g., a bell crank), electrical (e.g., a controller such as a MASS), or pressurized fluid.

20 Claims, 13 Drawing Sheets

AIRCRAFT EJECTION SEAT ASSEMBLY WITH INTEGRATED SURVIVAL KIT

CROSS-REFERENCE TO RELATED APPLICATIONS

This patent application is a non-provisional patent application of, and claims the benefit of, U.S. Provisional Patent Application Ser. No. 63/016,433, that is entitled "AIRCRAFT EJECTION SEAT ASSEMBLY WITH INTEGRATED SURVIVAL KIT," that was filed on 28 Apr. 2020, and the entire disclosure of which is hereby incorporated by reference herein.

FIELD

The present disclosure generally relates to the field of aircraft ejection seats and, more particularly, to incorporating a survival kit in the ejection seat.

BACKGROUND

Various aircraft have one or more ejection seats to displace an occupant from the aircraft under certain circumstances. Representative components incorporated by an ejection seat include a main parachute, a drogue parachute, and a survival kit. Survival kits for at least certain ejection seats are stored in the base, which increases the height of the ejection seat and which may limit the number of platforms with which such ejection seats may be utilized. Additionally, the current location of the survival kit may increase the risk of injury upon seat/occupant separation, as the survival kit is commonly tethered to the seat occupant. During ejection from an aircraft, the main parachute pulls up on the occupant, while the survival kit pulls downward, potentially elongating and straining the occupant's spine.

SUMMARY

An aircraft ejection seat assembly with a survival kit storage system is presented herein. The configuration of such an aircraft ejection seat assembly (e.g., with regard to a survival kit storage system) and the operational characteristics of such an aircraft ejection seat assembly (e.g., with regard to a survival kit storage system), are within the scope of this Summary.

The aircraft ejection seat assembly may include an aircraft ejection seat, which in turn may include a seat back. A survival kit may be incorporated into the seat back. An actuator may be used to release the survival kit from at least a portion of the seat back. In this regard, at least one actuator may be interconnected with one or more retention pins that secure the survival kit relative to the seat back. Activation of an actuator moves a corresponding retention pin(s) from a retention position to a released position. The released position for the retention pin allows the survival kit to separate from at least a portion of the seat back.

A number of different types of actuators may be used to release the survival kit from at least part of the seat back. An actuator may be responsive to an electrical signal to move the corresponding retention pin(s) from the retention position to the released position. This electrical signal may be provided by a controller for the aircraft ejection seat assembly. Such a controller may include one or more processors of any appropriate size, shape, configuration, and/or type, and may use any appropriate processing architecture. This controller also may be configured to initiate a variety of gas-generating components singularly or in conjunction with multiple gas-generating components within the aircraft ejection seat assembly (e.g. a divergence thruster, a gas generator, a bell crank thruster).

An actuation system may include an actuator (e.g., a bell crank) that moves from a first position to a second position to responsively move a corresponding retention pin(s) from the retention position to the released position. The actuator system may also include a locking pin and a biasing member (e.g., a spring) or other actuator. The locking pin may extend at least into the retention pin, and the biasing member may engage the retention pin. A link (e.g., a cable) may extend from the actuator to the locking pin. Activation of the actuator (to move the same from the first position to the second position) may exert a force on the link to remove (e.g., withdraw) the locking pin from the retention pin such that the biasing member (or other actuator) moves the retention pin from the retention position to the released position.

The actuator may be in the form of a pressurized fluid source, and which may be in the form of a stored fluid in a pressure vessel or which may be in the form of a gas generator (e.g., which uses a gas-generating propellant). Pressurized fluid may be released from the fluid source in any appropriate manner to exert a fluid pressure on the retention pin to move the retention pin from the retention position to the released position.

Various aspects of the present disclosure are also addressed by the following paragraphs and in the noted combinations:

1. An aircraft ejection seat assembly, comprising:
an aircraft ejection seat comprising a seat back;
a survival kit incorporated into said seat back;
a retention pin; and
an actuator interconnected with said retention pin, wherein activation of said actuator moves said retention pin from a retention position to a released position, wherein said released position allows said survival kit to separate from at least a portion of said seat back.

2. The aircraft ejection seat assembly of paragraph 1, wherein said survival kit is disposed within an interior of said seat back.

3. The aircraft ejection seat assembly of any of paragraphs 1-2, wherein said seat back comprises a panel detachably connected to a remainder of said seat back by said retention pin.

4. The aircraft ejection seat assembly of any of paragraphs 1-3, further comprising a parachute and at least one parachute line, wherein said at least one parachute is connectable with a user at a first location, and wherein said survival kit is connected with said at least one parachute line at a second location that is spaced from said first location.

5. The aircraft ejection seat assembly of any of paragraphs 1-4, wherein said actuator comprises a pressurized fluid source fluidly connectable with said retention pin.

6. The aircraft ejection seat assembly of paragraph 5, wherein said pressurized fluid source comprises a gas generator.

7. The aircraft ejection seat assembly of any of paragraphs 5-6, further comprising a conduit and a housing comprising a retention pin actuation chamber, wherein said retention pin is movably connected with said housing, wherein said conduit extends from said pressurized fluid source to said housing, and wherein said retention pin actuation chamber is fluidly connectable with said pressurized fluid source.

8. The aircraft ejection seat assembly of paragraph 7, wherein directing pressurized fluid into said retention pin actuation chamber moves said retention pin from said retention position to said released position.

9. The aircraft ejection seat assembly of any of paragraphs 1-4, wherein said actuator comprises a controller electrically connectable with said actuator.

10. The aircraft ejection seat assembly of paragraph 9, wherein said controller is configured to send a signal to said actuator such that said actuator moves said retention pin from said retention position to said released position.

11. The aircraft ejection seat assembly of any of paragraphs 9-10, wherein said controller is operatively connectable with at least one additional component of said aircraft ejection seat assembly.

12. The aircraft ejection seat assembly of paragraph 11, wherein said at least one additional component is selected from the group consisting of one or more gas-generating components to actuate an additional subsystem of said aircraft ejection seat assembly.

13. The aircraft ejection seat assembly of any of paragraphs 9-12, wherein said controller comprises an ejection seat sub-assembly controller.

14. The aircraft ejection seat assembly of any of paragraphs 1-4, wherein said actuator is movable from a first position to a second position, which responsively moves said retention pin from said retention position to said released position.

15. The aircraft ejection seat assembly of any of paragraphs 1-4 and 14, wherein said actuator comprises at least one mechanical actuator that is mechanically interconnectable with said retention pin.

16. The aircraft ejection seat assembly of any of paragraphs 14-15, wherein an actuation system comprises said actuator, a locking pin, and a biasing member, wherein said locking pin extends at least into said retention pin, and wherein said biasing member engages said retention pin.

17. The aircraft ejection seat assembly of paragraph 16, further comprising a link extending from said actuator to said locking pin, wherein activation of said actuator exerts a force on said link to remove said locking pin from said retention pin such that said biasing member moves said retention pin from said retention position to said released position.

18. The aircraft ejection seat assembly of any of paragraphs 1-4, wherein said retention pin moves from said retention position to said released position in response to movement of at least one component.

19. A method of operating an aircraft ejection seat assembly comprising a seat back that incorporates a survival kit, comprising:
retaining said survival kit relative to said seat back using a retention pin disposed in a retention position;
activating an actuator, wherein said activating comprises moving said retention pin from said retention position to a released position; and
releasing said survival kit from at least part of said seat back with said retention pin being in said released position.

20. The method of paragraph 19, wherein said retention pin maintains said survival kit in a fixed position relative to said seat back with said retention pin being in said retention position, and wherein said retention pin being in said released position allows said survival kit to separate from said at least part of said seat back.

21. The method of any of paragraphs 19-20, further comprising:
suspending said survival kit from at least one parachute line.

22. The method of any of paragraphs 19-21, wherein said activating comprises sending an electrical signal to said actuator.

23. The method of any of paragraphs 19-21, wherein said activating comprises exposing said retention pin to a pressurized fluid.

24. The method of any of paragraphs 19-21, wherein said activating comprises removing a locking pin from said retention pin and thereafter moving said retention pin from said retention position to said released position.

25. The method of paragraph 24, wherein said activating further comprises moving said actuator from a first position to a second position.

26. The method of any of paragraphs 24-25, wherein said removing comprises exerting a mechanical force on said locking pin.

27. The method of any of paragraphs 24-26, wherein said moving comprises expanding a spring at least operatively interconnected with said retention pin.

28. The method of any of paragraphs 19-21, wherein said moving comprises moving said retention pin from said retention position to said released position in response to movement of at least one other component.

DETAILED DESCRIPTION

Figure 1:
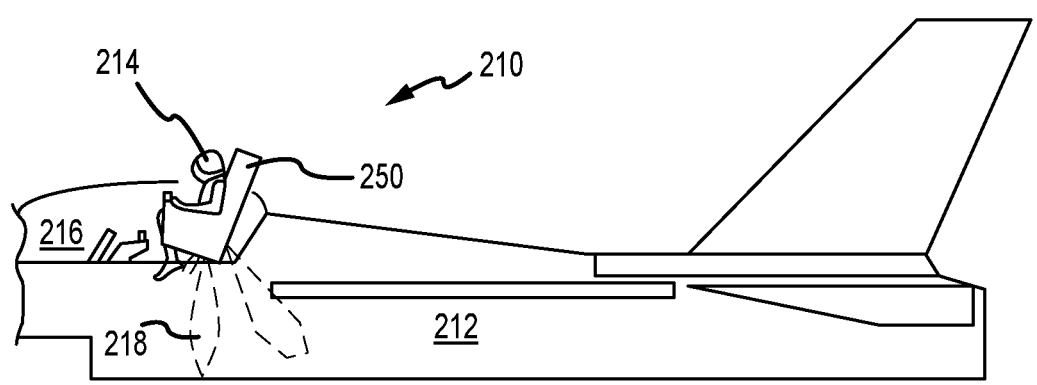
FIG. 1 is a schematic of an aircraft with an aircraft ejection system, in various embodiments.

With reference to FIG. 1, an aircraft ejection system 210 is shown, in accordance with various embodiments. The aircraft ejection system 210 may be installed in an aircraft 212 to expel an ejection seat 250 and an occupant 214 of the ejection seat 250 from a cockpit 216 of the aircraft 212. The ejection seat 250 may be urged from the cockpit 216 by a propulsion system 218.

Figure 1A:
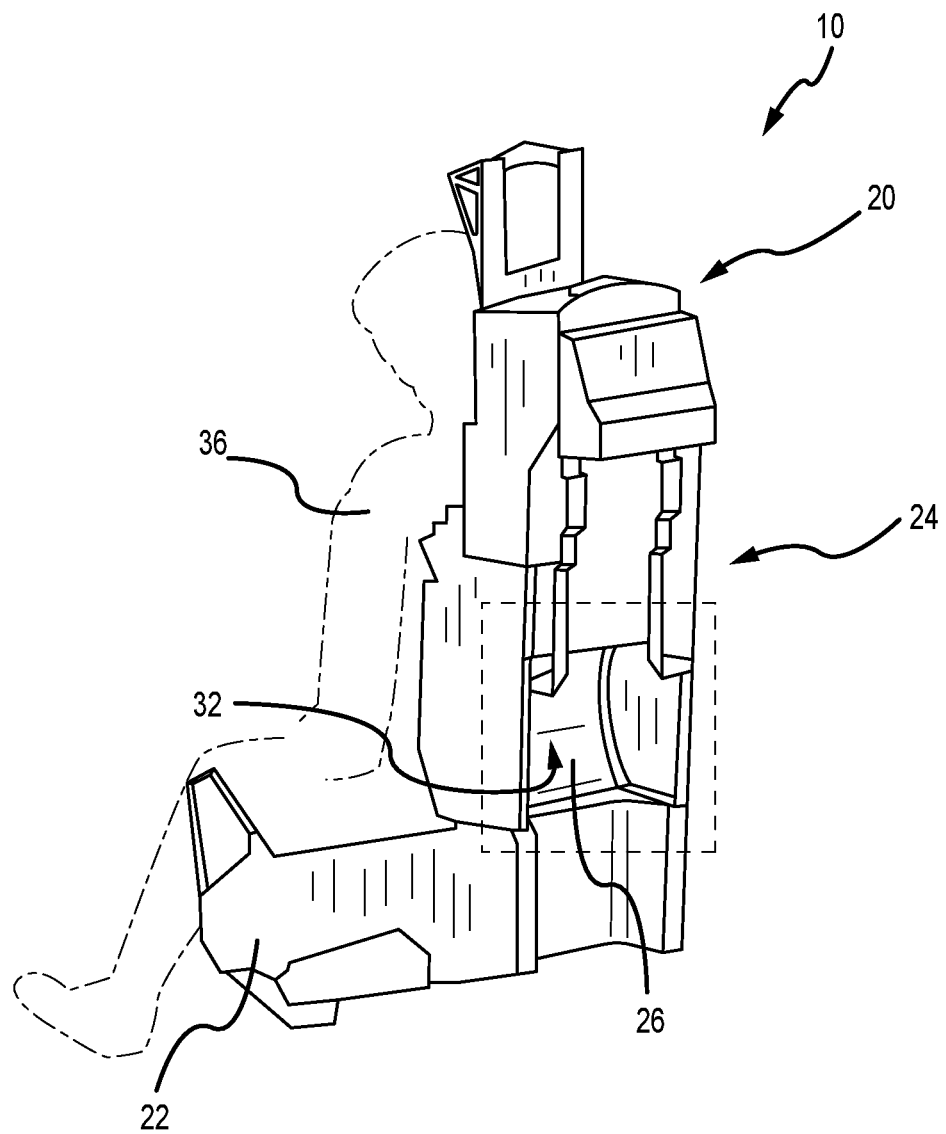
FIG. 1A is a rear, perspective view of an aircraft ejection seat assembly, in various embodiments.
Figure 2:
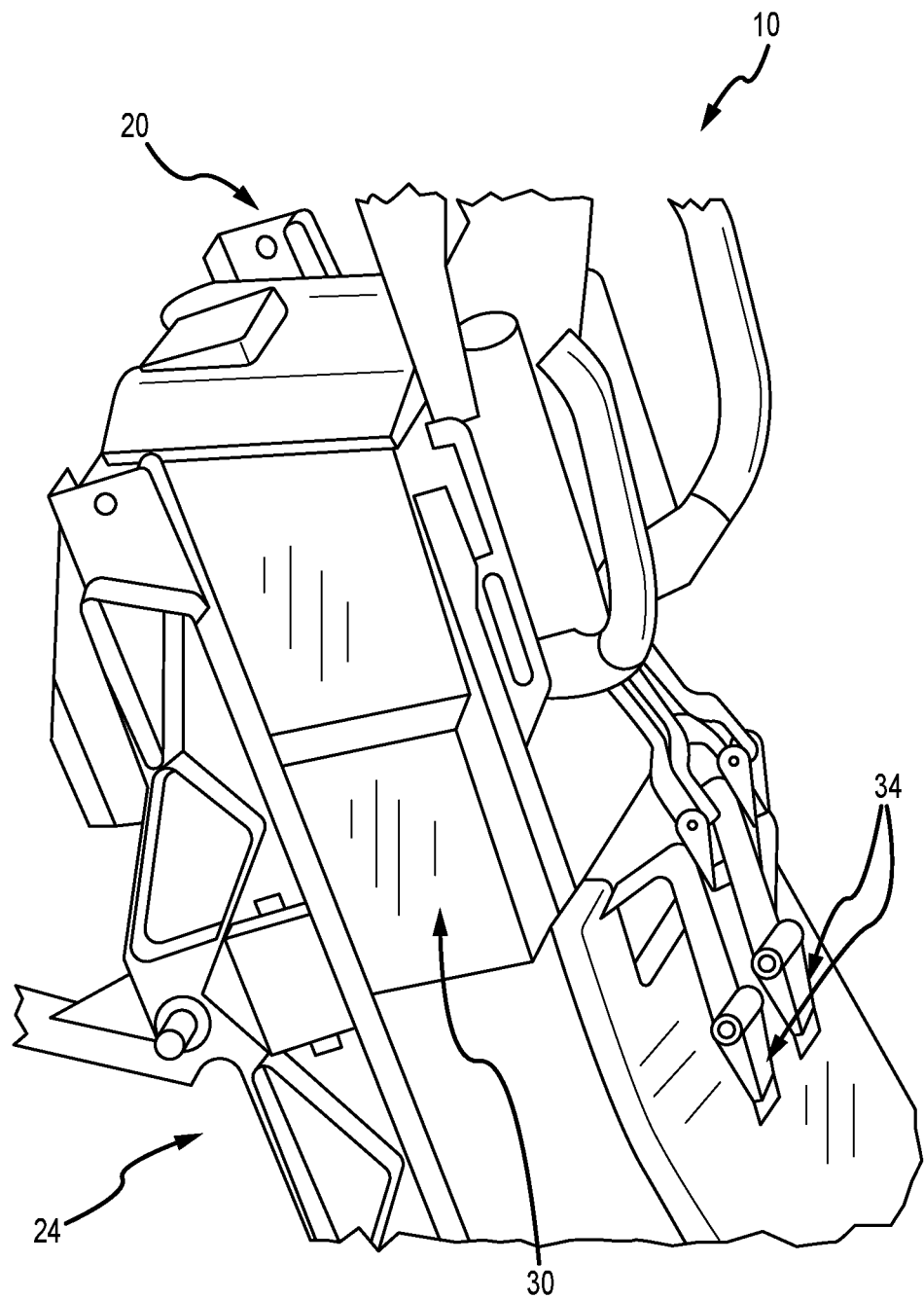
FIG. 2 is a front, perspective view of the aircraft ejection seat assembly shown in FIG. 1A, in various embodiments.

An aircraft ejection seat assembly in accordance with various embodiments is illustrated in FIGS. 1A and 2, is identified by reference numeral 10, and may be used by any appropriate aircraft, such as the aircraft 212 of FIG. 1. The aircraft ejection seat assembly 10 includes an ejection seat 20 having a seat bucket, bottom, or base 22 on which an occupant 36 (e.g., a pilot, flight crew member) is seated, along with a seat back 24 against which a back of the occupant 36 may engage. The seat back 24 includes a panel or seat back skin 26 that is detachably connected with a remainder of the seat back 24 in a manner that will be discussed in more detail below. Other components of the aircraft ejection seat assembly 10 include a survival kit storage or compartment 32 (e.g., for storage of a survival kit; internal relative to the ejection seat 20), a main parachute box or compartment 30 (e.g., for storage of at least a main parachute for the occupant 36 for the case of an ejection from the aircraft, such as aircraft 212 of FIG. 1), and parachute straps/connectors 34 to interconnect the occupant 36 with at least the main parachute. A survival kit may be positioned in the survival kit compartment 32 so as to be located within an interior of the ejection seat 20 and more particularly within the seat back 24.

Figure 3:
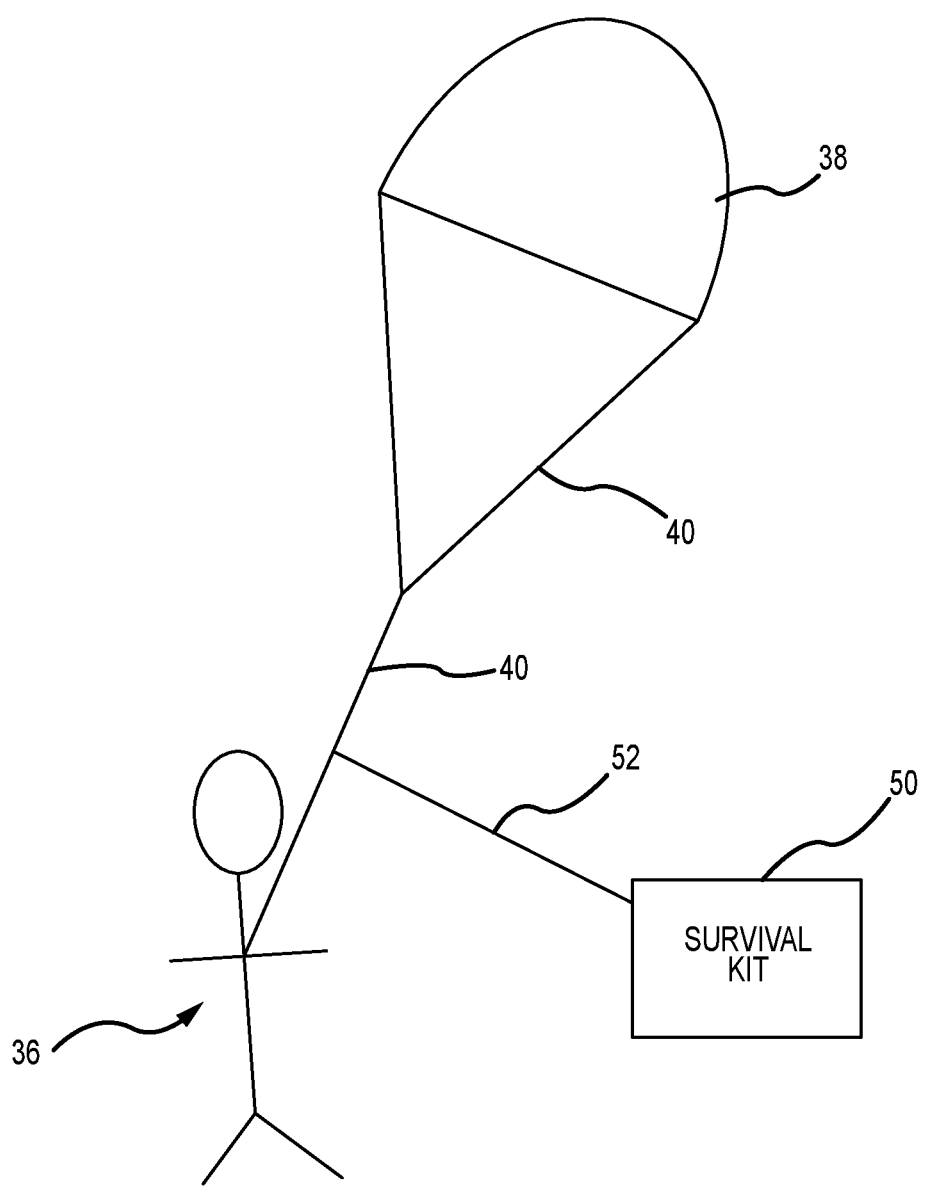
FIG. 3 is a schematic of an integration of a deployed survival kit with a parachute for an aircraft ejection seat assembly, in various embodiments.

FIG. 3 is a schematic of an integration of a survival kit 50 with an aircraft ejection seat assembly (e.g., aircraft ejection seat assembly 10) in accordance with various embodiments. One or more parachute lines 40 extend from the occupant 36 to a main parachute 38. In any case, the survival kit 50 is tethered from one or more of the parachute lines 40 (e.g., a parachute line) by one or more survival kit lines 52. That is, one or more survival kit lines 52 extend from one or more of the parachute lines 40 and to the survival kit 50. The "point of connection" of the survival kit 50 to the one or more parachute lines 40 is spaced from the "point of connection" of the occupant 36 to the one or more parachute lines 40.

Figure 4:
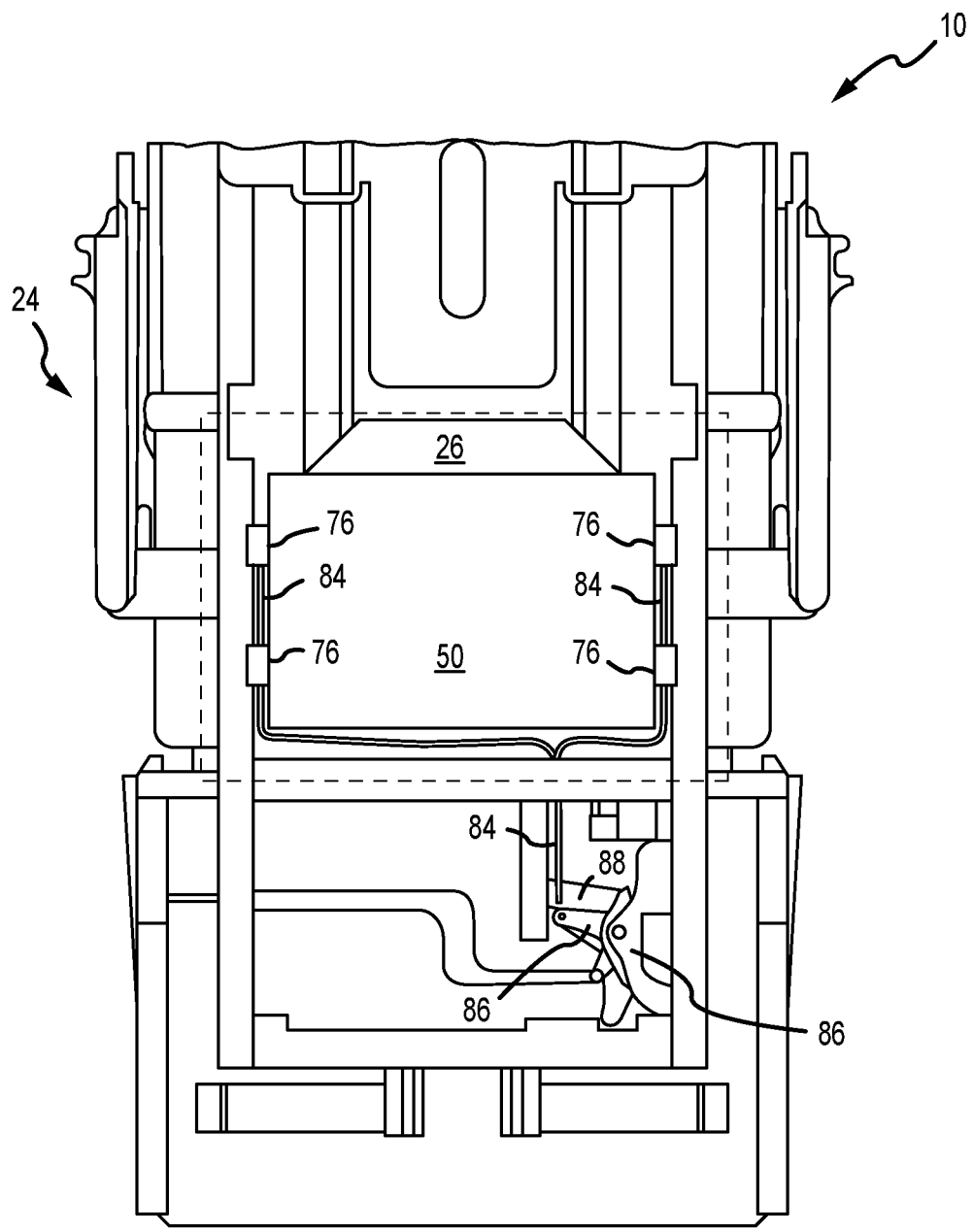
FIG. 4 is a rear view of an aircraft ejection seat assembly, that utilizes a mechanical actuation assembly (e.g., bell crank) as an actuator for release of a survival kit, in various embodiments.
Figure 5:
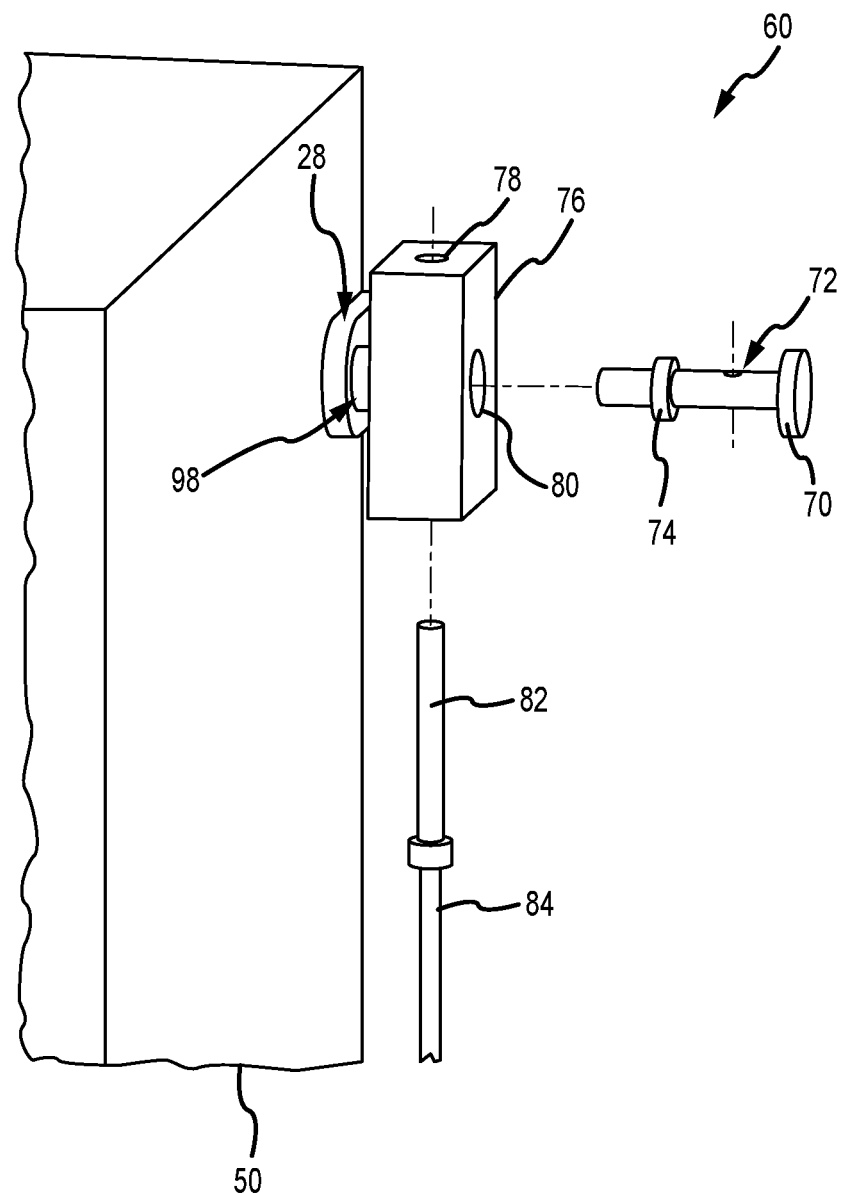
FIG. 5 is a perspective view of a detachable connection for a survival kit used by the aircraft ejection seat assembly shown in FIG. 4, in various embodiments.

A release assembly for a survival kit in accordance with various embodiments (e.g., an integration of the survival kit 50 at least generally in accordance with FIG. 3) that may be used by an aircraft ejection seat assembly (e.g., aircraft ejection seat assembly 10) is illustrated in FIGS. 4-5 and is identified by reference numeral 60. FIGS. 4 and 5 show the survival kit 50 in the survival kit compartment 32. The survival kit 50 may remain attached/tethered to the panel 26 when released from a remainder of the seat back 24 and as will be discussed in more detail below.

Figure 5A:
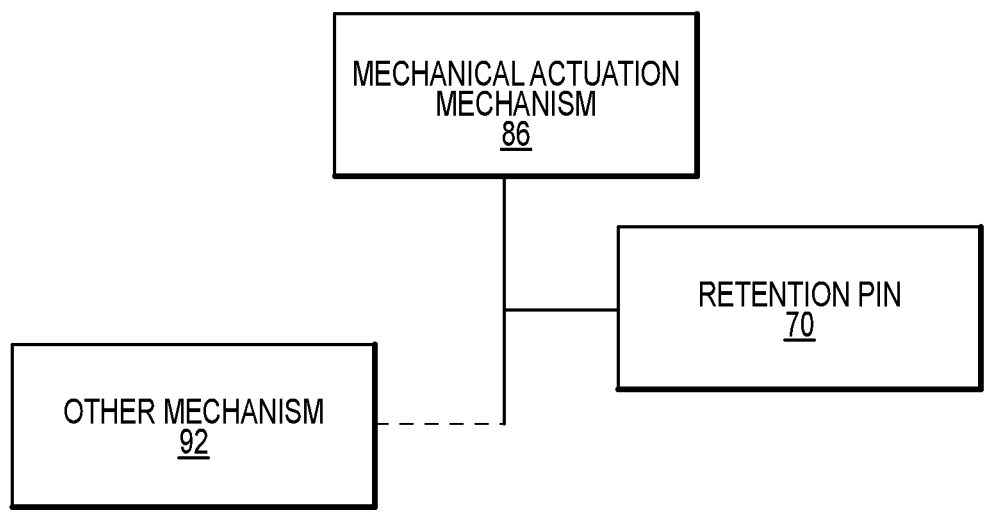
FIG. 5A is a schematic of representative components that may be connected to the mechanical actuation assembly (e.g., bell crank) of an aircraft ejection seat assembly, in various embodiments.

The release assembly 60 may be characterized as using one or more mechanical actuators, for instance in the form of a mechanical actuation assembly 86 (e.g., a bell crank). The mechanical actuation assembly 86 may be moved (e.g., rotated) at the appropriate time of the ejection process (where the ejection seat assembly 10 is jettisoned from the aircraft, such as the aircraft 212 of FIG. 1). Various components of the aircraft ejection seat assembly 10 may be at least operatively interconnected with the mechanical actuation assembly 86, such as a latch 88 and one or more other mechanisms 92 (FIG. 5A). For instance, movement/rotation of the mechanical actuation assembly 86 may move a latch 88 (FIG. 4) from a latched position to an unlatched position, and which may withdraw one or more block pins and actuate one or more other mechanisms 92.

The panel 26 (e.g., FIGS. 1A, 4, and 5) in the case of the release assembly 60 is detachably connected with a remainder of the seat back 24 by one or more retention pins 70 that extend through a hole 80 in a corresponding housing 76 and at least into a corresponding flange 28 that is coupled with the seat back 24 (e.g., the survival kit 50 is captured between the panel 26 and one or more flanges 28, and the panel 26, survival kit 50, and each flange 28 are collectively releasable from the remainder of the seat back 24). Each retention pin 70 includes a locking pin hole 72 that may extend completely through the retention pin 70. A locking pin 82 extends through a hole 78 in the housing 76 and at least into (including through) the hole 72 in the retention pin 70. A cable or link 84 extends from the locking pin 82 to the mechanical actuation assembly 86 of the aircraft ejection seat assembly 10. One or more links 84 could be used, including for the case where multiple retention pins 70 are used.

The retention pin 70 includes a collar 74 that is engaged by a biasing member 98 (e.g., one or more springs). Movement of the mechanical actuation assembly 86 exerts a pulling force on the link 84, which withdraws the locking pin 82 from the corresponding retention pin 70. The biasing member 98 is thereby able to move the retention pin 70 out of engagement (e.g., a released position) with the flange 28, such that the panel 26 and the survival kit 50 both may be released from a remainder of the seat back 24.

Figure 6:
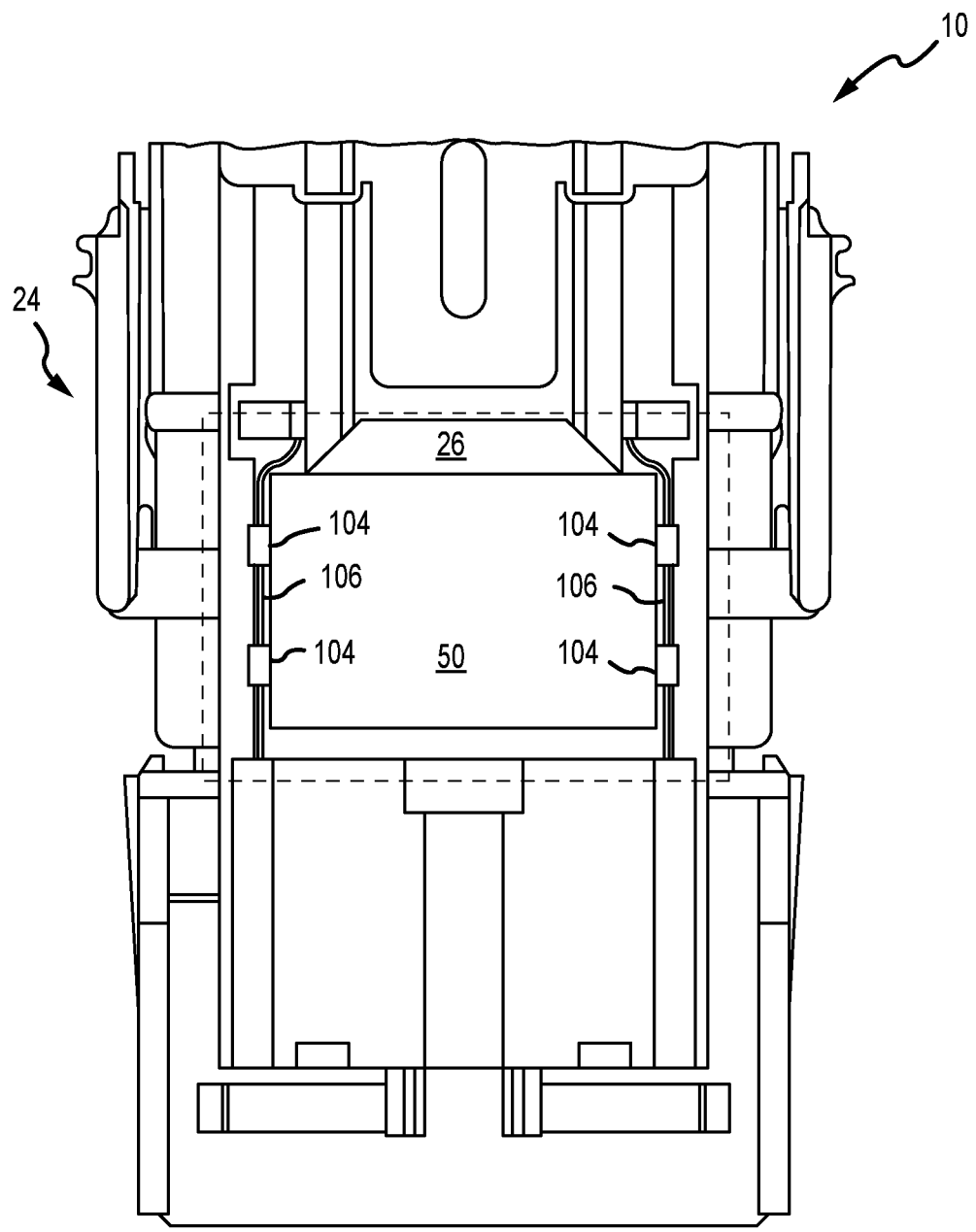
FIG. 6 is a rear view of an aircraft ejection seat assembly, that utilizes a controller and an electronic actuator for release of a survival kit, in various embodiments.
Figure 7:
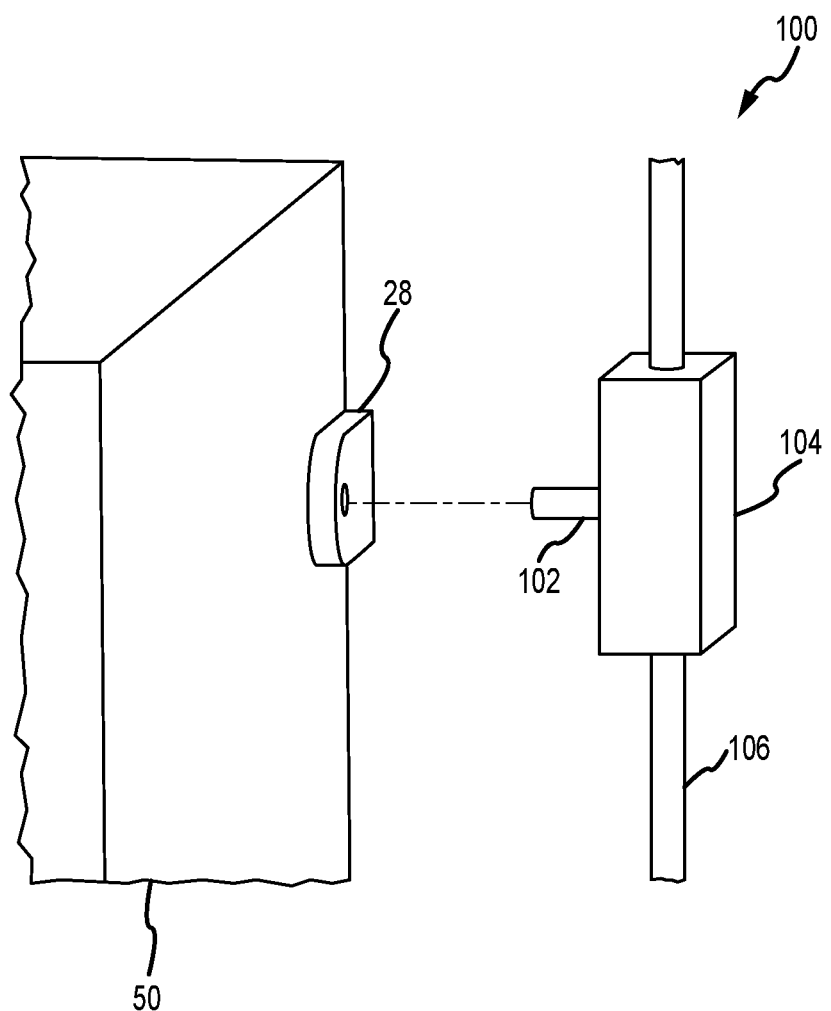
FIG. 7 is a perspective view of a detachable connection for a survival kit used by the aircraft ejection seat assembly shown in FIG. 6, in various embodiments.
Figure 8:
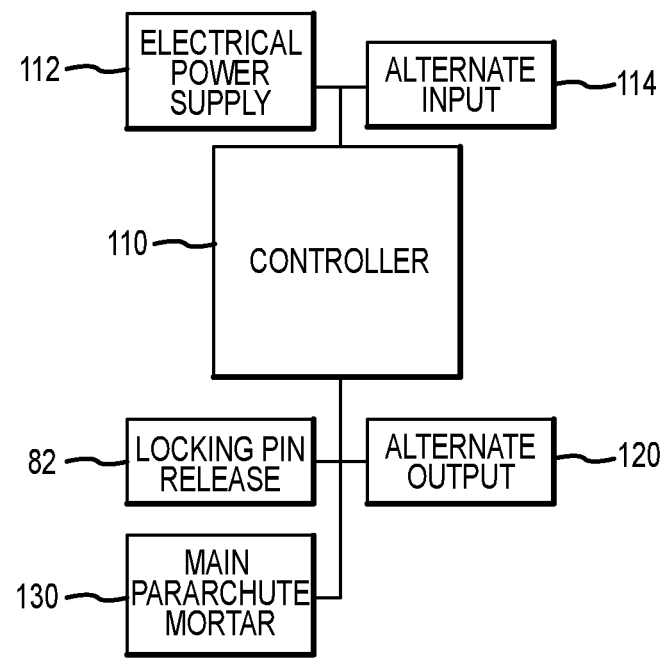
FIG. 8 is a schematic of representative ejection seat components that may be operatively interconnected with the controller for the aircraft ejection seat assembly shown in FIG. 6, in various embodiments.

A release assembly for a survival kit in accordance with various embodiments (e.g., an integration of the survival kit 50 at least generally in accordance with FIG. 3) that may be used by an aircraft ejection seat assembly (e.g., aircraft ejection seat assembly 10) is illustrated in FIGS. 6-8 and is identified by reference numeral 100. FIGS. 6 and 7 show the survival kit 50 in the survival kit compartment 32. The release assembly 100 may be characterized as using an electrical actuator, for instance one that is operatively interconnected with controller 110 (e.g., a Modernized ACES Seat Sequencer (MASS)).

The controller 110 may include one or more processors of any appropriate size, shape, configuration, and/or type, and may use any appropriate processing architecture. The controller 110 also may be configured to initiate various gas-generating components of the aircraft ejection seat assembly 10. Various components of the aircraft ejection seat assembly 10 may be at least operatively interconnected with the controller 110, including the representative components shown in the schematic of FIG. 8.

Representative inputs to the controller 110 include one or more electrical power supplies 112 (e.g. thermal batteries), one or more alternate inputs 114, or both. The alternate input 114 (e.g., a sequence start switch, dynamic pressure input device, gas generating device) may be in the form of a physical switch, and may be actuated in response to movement of the ejection seat 20 (e.g., movement along rails of the aircraft (e.g., aircraft 212-FIG. 1) and prior to being jettisoned from the aircraft, during ejection seat flight). Activation of an alternate input 114 may initiate one or more timing sequences used by the controller 110.

One or more of the electrical power supplies 112 (e.g., one or more thermal batteries) may be initiated by gas-generating components which may charge capacitors that send electrical signals to fire one or more other electrical power supplies 112 when the proper parameters are reached. The electrical power supplies 112 may provide the power to operate one or more timing circuits that may be used by the controller 110, may be used by the controller 110 to send one or more electrical initiation/control signals to one or more components that are operatively interconnected with the controller 110, or both.

The one or more alternate inputs 114 may be used by the controller 110 to select one of a plurality of operating modes for the controller 110.

Representative outputs from the controller 110 are shown in FIG. 8 and include an alternate output 120 (e.g. a divergence thruster, a gas generator, a bell crank thruster). The aircraft ejection seat assembly 10 may utilize a parachute system that in turn may include a main parachute mortar 130. The controller 110 may send an electrical/control signal to activate the main parachute mortar 130 to deploy the main parachute (e.g., main parachute 38) shown in FIG. 3. The controller 110 may also send one or more electrical/control signal(s) to move the mechanical actuation assembly 86 (e.g., FIG. 4) in accordance with the discussion presented above, for instance to release the locking pin 82 (FIG. 5).

The panel 26 (FIGS. 1A and 6) is detachably connected with a remainder of the seat back 24 by one or more retention pins 102 in the case of the release assembly 100 (FIG. 7), and that each extend from a corresponding actuator 104 (e.g., a solenoid). Each retention pin 102 extends at least into a corresponding flange 28, again where each flange 28 is coupled with the panel 26 and where the panel 26, survival kit 50, and each flange 28 are collectively releasable from a remainder of the seat back 24. An electrical line, cable, or conduit 106 extends from the actuator 104 to the controller 110. Activation of the actuator 104, upon receipt of one or more electrical/control signals from the controller 110, retracts the retention pin 102 out of engagement with the panel flange 28 such that the panel 26 and the survival kit 50 both may be released from a remainder of the seat back 24 in accordance with the foregoing.

Figure 9:
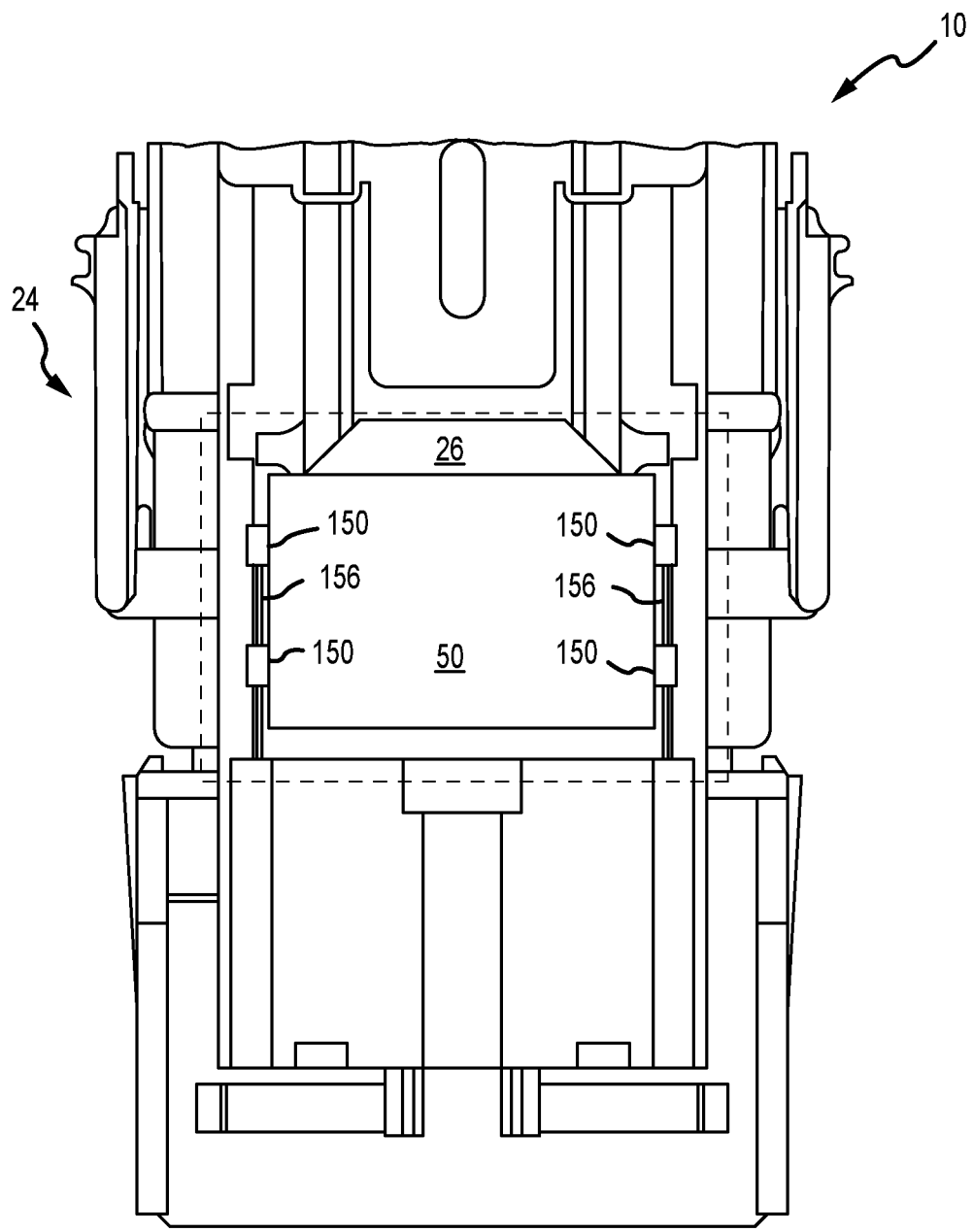
FIG. 9 is a rear view of an aircraft ejection seat assembly, that utilizes a pressurized fluid source as an actuator for release of a survival kit, in various embodiments.
Figure 10:
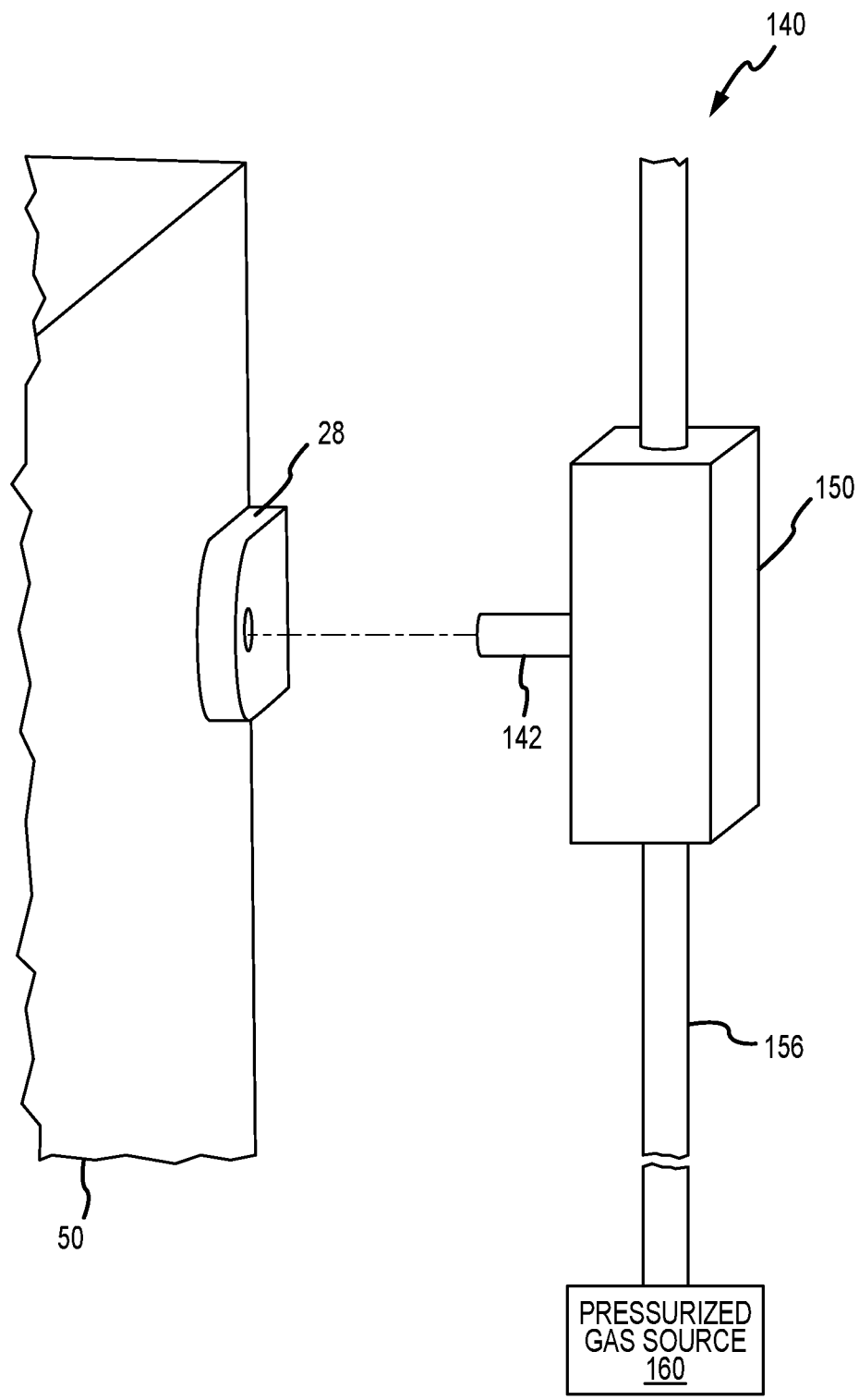
FIG. 10 is a perspective view of a detachable connection for a survival kit used by the aircraft ejection seat assembly shown in FIG. 9, in various embodiments.
Figure 11:
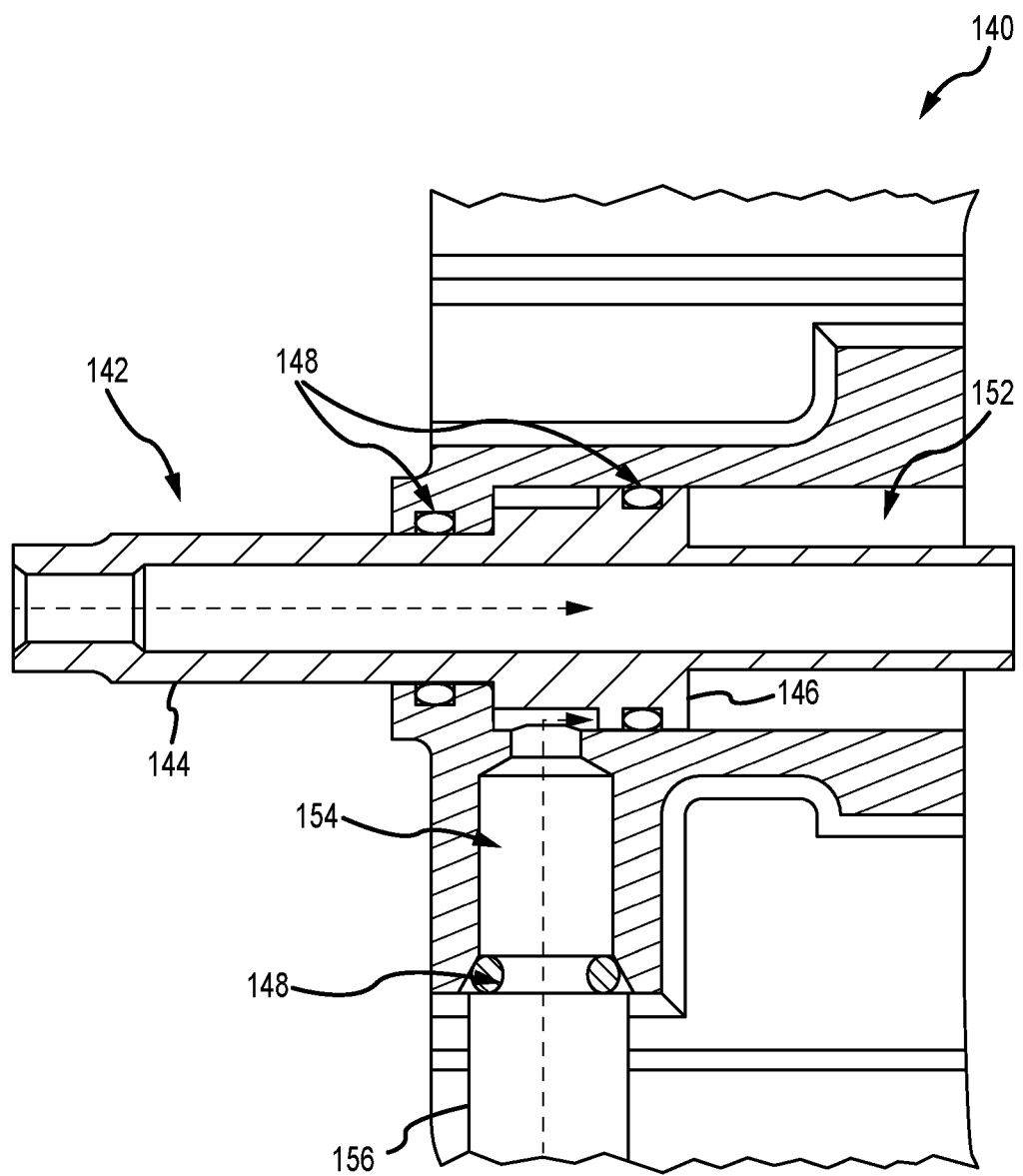
FIG. 11 is a schematic of a fluid path for pressurized fluid actuation by the aircraft ejection seat assembly shown in FIG. 9, in various embodiments.

A release assembly for a survival kit in accordance with various embodiments (e.g., an integration of the survival kit 50 at least generally in accordance with FIG. 3) that may be used by an aircraft ejection seat assembly (e.g., aircraft ejection seat assembly 10) is illustrated in FIGS. 9-11 and is identified by reference numeral 140. FIGS. 9 and 10 show the survival kit 50 in the survival kit compartment 32. The release assembly 140 may be characterized as using a pressurized fluid source 160 with an actuator 150 (e.g., collectively an actuation assembly). One or more gas generators (e.g., using a gas-generating propellant that is ignited by a signal from the controller 110-FIG. 8) may be used by the aircraft ejection seat assembly 10 to provide a corresponding function or combination of functions, and a portion of the resulting gas from an appropriate one of these gas generators may be used by the release assembly 140. The pressurized fluid source 160 could also be in the form of a stored gas (incorporated by the ejection seat assembly 10), where a signal from the controller 110 (e.g., FIG. 8) may be used to release the stored gas from this pressurized fluid source 160.

The panel 26 (e.g., FIGS. 1A, 9, and 10) is detachably connected with a remainder of the seat back 24 by one or more retention pins 142 in the case of the release assembly 140 (FIGS. 9-11), and that each extend from a corresponding actuator/housing 150. Each retention pin 142 may extend at least into a corresponding flange 28 that again is coupled with the panel 26 and where the panel 26, survival kit 50, and each flange 28 are collectively releasable from a remainder of the seat back 24. A tube or conduit 156 extends from the pressurized fluid source 160 to the actuator/housing 150 to direct fluid (e.g., hot gas) into the actuator/housing 150 to move/retract the corresponding retention pin 142 out of engagement with the corresponding flange 28 such that the panel 26 and the survival kit 50 both may be released from a remainder of the seat back 24 in accordance with the foregoing.

Details of the actuator/housing 150 and retention pin 142 are shown in FIG. 11. The retention pin 142 is movably incorporated by the actuator/housing 150. The retention pin 142 includes a shaft 144 that extends from the actuator/housing 150 and that engages the above-noted flange 28. A head 146 of the retention pin 142 is disposed within a retention pin chamber 152 of the actuator/housing 150. One or more seals (e.g., an O-ring) 148 may be disposed between the actuator/housing 150 and one or more of: 1) the shaft 144 of the retention pin 142; 2) the head 146 of the retention pin 142; and 3) the conduit 156.

A fluid flowing from the pressurized fluid source 160, through the conduit 156, is directed into a chamber 154 of the actuator/housing 150. The chamber 154 is fluidly connected with the retention pin chamber 152 in a manner such that directing fluid into the retention pin chamber 152 moves the retention pin 142 relative to the actuator/housing 150 to disengage the retention pin 142 from the flange 28. The panel 26, each flange 28, and the survival kit 50 may then be collectively released from a remainder of the seat back 24 in accordance with the foregoing.

The aircraft ejection seat assemblies disclosed herein, where the survival kit 50 is incorporated by the seat back 24 of the ejection seat 20 (versus being stowed in the seat bucket 22) and where the survival kit 50 is suspended from one or more parachute lines 40 (versus from the individual ejected from the aircraft) provides a number of benefits. Tethering the survival kit 50 from one or more parachute lines should reduce the physical stress exerted on the user's spine (and thereby the potential for injury) compared to when tethering the survival kit from the user. Incorporating the survival kit 50 into the seat back 24 versus the seat bucket 22 may allow the aircraft ejection seat assembly 10 to be used with aircraft cockpits of various sizes due to the potential seat height reduction as a result, may allow the space in the seat bucket to be used for other purposes (e.g. to house one or more sub-assemblies of the aircraft ejection seat assembly 10), eliminates the need for hinging seat pan, may improve the center of gravity of the user 36 and the ejection seat 20 during the windblast phase as the survival kit 50 is positioned closer to the user's body.

Any feature of any other various aspects addressed in this disclosure that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular. Moreover, any failure to use phrases such as "at least one" also does not limit the corresponding feature to the singular. Use of the phrase "at least generally" or the like in relation to a particular feature encompasses the corresponding characteristic and insubstantial variations thereof (e.g., indicating that a surface is at least substantially or generally flat encompasses the surface actually being flat and insubstantial variations thereof). Finally, a reference of a feature in conjunction with the phrase "in one embodiment" does not limit the use of the feature to a single embodiment.

The foregoing description has been presented for purposes of illustration and description. Furthermore, the description is not intended to limit the invention to the form disclosed herein. Consequently, variations and modifications commensurate with the above teachings, and skill and knowledge of the relevant art, are within the scope of the present disclosure. Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An aircraft ejection seat assembly, comprising:
   an aircraft ejection seat comprising a seat back;
   a survival kit incorporated into said seat back;
   a retention pin; and
   an actuator interconnected with said retention pin, wherein activation of said actuator moves said retention pin from a retention position to a released position, wherein said released position allows said survival kit to separate from at least a portion of said seat back.

2. The aircraft ejection seat assembly of claim 1, wherein said seat back comprises a panel detachably connected to a remainder of said seat back by said retention pin.

3. The aircraft ejection seat assembly of claim 1, further comprising a parachute and at least one parachute line, wherein said at least one parachute is connectable with a user at a first location, and wherein said survival kit is connected with said at least one parachute line at a second location that is spaced from said first location.

4. The aircraft ejection seat assembly of claim 1, wherein said actuator comprises a pressurized fluid source fluidly connectable with said retention pin.

5. The aircraft ejection seat assembly of claim 4, further comprising a conduit and a housing comprising a retention pin actuation chamber, wherein said retention pin is movably connected with said housing, wherein said conduit extends from said pressurized fluid source to said housing, and wherein said retention pin actuation chamber is fluidly connectable with said pressurized fluid source.

6. The aircraft ejection seat assembly of claim 5, wherein directing pressurized fluid into said retention pin actuation chamber moves said retention pin from said retention position to said released position.

7. The aircraft ejection seat assembly of claim 1, wherein said actuator comprises a controller electrically connectable with said actuator.

8. The aircraft ejection seat assembly of claim 7, wherein said controller is configured to send a signal to said actuator such that said actuator moves said retention pin from said retention position to said released position.

9. The aircraft ejection seat assembly of claim 7, wherein said controller is operatively connectable with at least one additional component of said aircraft ejection seat assembly.

10. The aircraft ejection seat assembly of claim 7, wherein said controller comprises an ejection seat assembly controller.

11. The aircraft ejection seat assembly of claim 1, wherein said actuator is movable from a first position to a second position, which responsively moves said retention pin from said retention position to said released position.

12. The aircraft ejection seat assembly of claim 11, wherein said actuator comprises a mechanical actuation assembly that is interconnectable with said retention pin.

13. The aircraft ejection seat assembly of claim 12, wherein said mechanical actuation assembly is connectable with at least one additional component of said ejection seat assembly.

14. The aircraft ejection seat assembly of claim 11, wherein an actuation system comprises said actuator, a locking pin, and a biasing member, wherein said locking pin extends at least into said retention pin, and wherein said biasing member engages said retention pin.

15. The aircraft ejection seat assembly of claim 14, further comprising a link extending from said actuator to said locking pin, wherein activation of said actuator exerts a force on said link to remove said locking pin from said retention pin such that said biasing member moves said retention pin from said retention position to said released position.

16. A method of operating an aircraft ejection seat assembly comprising a seat back that incorporates a survival kit, comprising:
retaining said survival kit relative to said seat back using a retention pin disposed in a retention position;
activating an actuator, wherein said activating comprises moving said retention pin from said retention position to a released position; and
releasing said survival kit from at least part of said seat back with said retention pin being in said released position.

17. The method of claim 16, further comprising:
suspending said survival kit from at least one parachute line.

18. The method of claim 16, wherein said activating comprises at least one of sending an electrical signal to said actuator and exposing said retention pin to a pressurized fluid.

19. The method of claim 16, wherein said activating comprises removing a locking pin from said retention pin before moving said retention pin from said retention position to said released position.

20. The method of claim 16, wherein said moving comprises moving said retention pin from said retention position to said released position in response to movement of at least one other component.

* * * * *